March 29, 1932.  H. M. FITCH  1,851,698

FISHHOOK

Filed Oct. 16, 1929

Inventor
Harley M. Fitch
By Roberts Cushman & Woodberry
his Attorneys

Patented Mar. 29, 1932

1,851,698

UNITED STATES PATENT OFFICE

HARLEY M. FITCH, OF PRINCETON, MAINE

FISHHOOK

Application filed October 16, 1929. Serial No. 399,950.

The invention pertains to fishhooks, and more particularly to a fishhook designed for the ready attachment of feathers, bristles, fur, or such other material as is commonly employed in the manufacture of artificial fishing flies or lures. According to usual practice the fisherman must provide himself with an assortment of complete flies of different kinds in order to meet the varying conditions of fishing, each fly usually consisting of a hook having permanently attached to its shank, as for example by wrappings of waxed thread, such materials as may be necessary to simulate the appearance of natural insects or other bait, or to provide such other lures as experience has proven to be attractive to fish. Such flies usually are provided with gut or other leaders, and are quite troublesome to keep in proper condition or to carry conveniently in large assortment. Moreover, in order to substitute one fly for another, it is necessary to untie and retie the fish line, an operation which is not always easy to perform.
In accordance with the present invention I provide a hook (having the usual leader, if desired) comprising means whereby the fisherman, without detaching the hook from the line, can easily change the appearance or shape of the fly so as to accommodate it to any condition met with in fishing. As it is much easier to carry colored feathers, bristles, fur, or other material, commonly employed in making flies, in unattached condition than when made up into completed flies, it is possible for the fisherman to carry a very large and complete assortment of fly forming material in a small and compact container from which he can select and attach at a moment's notice such substances as appear most appropriate to the occasion. To this end in accordance with the present invention the hook is provided, preferably upon its shank portion, with a clamping device of resilient character adapted to hold the fly forming material securely, while permitting its ready release when desired. This clamping means forms a permanent part of the hook and may readily be manipulated with one hand, leaving the other hand free to select and introduce the fly forming material, and when the clamping means is released, it automatically resumes its clamping function so that further manipulation is not required.

In the accompanying drawings, wherein I have disclosed one desirable embodiment of the invention by way of example:

Figure 1:
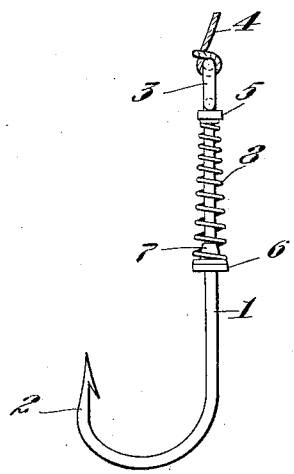
Fig. 1 is a side elevation of a bare hook comprising my invention.

Referring to the drawings, I have shown a hook of substantially usual form comprising the shank 1 and the hook proper 2, the shank being provided at its upper end with any usual means as, for example, the ring 3 to which the line or leader 4 may be secured. At a point immediately below the attaching means 3, I prefer to provide a collar or ring 5 which may be fixed to the shank of the hook or may merely bear against the ring 3, as may be preferred. At a point suitably spaced from this ring or collar 5, I provide an abutment ring 6 fixedly secured to the shank 1 in any desired manner, such ring constituting one element of the clamping device. Preferably, although not necessarily, this abutment ring 6 is provided with a truncated conical extension 7 whose larger end preferably is of slightly smaller diameter than the ring 6 so as to form an abutment shoulder at the upper side of the ring. A coiled compression spring 8 encircles the shank 1, such spring being interposed between the collars 5 and 6 and normally bearing with resilient pressure against the collar 6. Preferably, as shown, this spring is of tapering form, having its larger end arranged to engage the abutment 6 and to embrace the conical extension 7.

Figure 2:
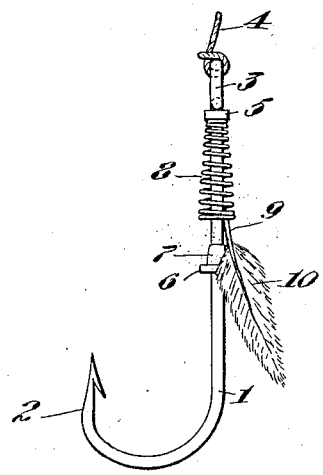
Fig. 2 is a side elevation illustrating the clamping means arranged to receive the fly forming material.
Figure 3:
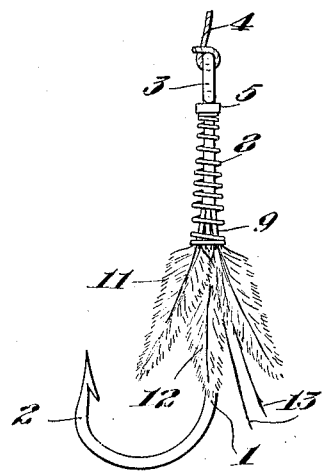
Fig. 3 is a side elevation of a completed fly.

Such a hook may be secured either directly to the line, or by means of an interposed leader, and when it is desired to use the same for fly fishing, the fisherman, having first provided himself with a receptacle containing an assortment of suitably colored feathers, bristles, fur, or the like, picks out from such assortment the material which he requires, for example, a feather 10 (Fig. 2), and first retracting the large end of the spring 8 from the abutment 6, introduces the shaft 9 of the feather into the larger end of the spring, permitting the feather to rest against the edge of the ring 6. If he so desire, he may introduce other feathers 11, 12, etc. (Fig. 3), in like manner, and in the same way the ends of bristles 13. When this material has been suitably arranged, the spring 8 is released, and by its expansion firmly clasps the fly forming material against the cone 7 and the edge of the ring 6. The conical member 7, when used, assists in causing the fly forming material to diverge in a desirable manner outwardly from the shank of the hook without tendency to break the shafts of the feathers, but if desired this conical member 7 may be dispensed with, although I prefer to employ it.

When the fisherman desires to change the character of the fly, it is merely necessary to retract the spring 8 from the abutment 6, remove the old fly forming material, and introduce other material, whereupon the spring is again permitted to expand and the fly is immediately ready for use.

It may be noted that in using this device the spring is readily retracted by the fingers of one hand, and when the fly forming material has been put in place, the mere release of the spring completes the clamping action so that it is not necessary to actuate screw devices or other troublesome clamping means, and thus there is little danger or derangement of the fly forming material during the clamping operation. Moreover, as the clamping means forms a permanent part of the hook, it can not be displaced or lost, while at the same time the fly forming material may be kept in most compact form, since it embodies no extraneous parts, and does not require to be first mounted upon supplementary attaching means.

While I have disclosed one desirable embodiment of the invention, I wish it to be understood that the invention is not necessarily limited to the precise construction, but that it embraces all equivalents falling within the scope of the appended claim.

I claim:

A fishing fly comprising a hook having a shank provided at its end with line attaching means, a collar adjacent to said end of the shank, a clamping collar spaced from the first collar and fixed to the shank, a spring interposed between said collars, fly forming material clamped between the end portion of the spring and said abutment collar, and means tending to cause such fly forming material to diverge outwardly from its point of attachment to the hook.

Signed by me at Princeton, Me., this 10th day of October 1929.

HARLEY M. FITCH.